(12) United States Patent
Saga et al.

(10) Patent No.: US 10,747,247 B2
(45) Date of Patent: Aug. 18, 2020

(54) POWER SUPPLY CIRCUIT

(71) Applicant: NEW JAPAN RADIO CO., LTD., Chuo-ku, Tokyo (JP)

(72) Inventors: Takafumi Saga, Fujimino (JP); Toshiyuki Nagai, Fujimino (JP); Akinori Ohmae, Fujimino (JP)

(73) Assignee: NEW JAPAN RADIO CO., LTD., Chuo-Ku, Tokyo (JP)

( * ) Notice: Subject to any disclaimer, the term of this patent is extended or adjusted under 35 U.S.C. 154(b) by 0 days.

(21) Appl. No.: 16/466,586

(22) PCT Filed: Dec. 18, 2017

(86) PCT No.: PCT/JP2017/045326
§ 371 (c)(1),
(2) Date: Jun. 4, 2019

(87) PCT Pub. No.: WO2018/117026
PCT Pub. Date: Jun. 28, 2018

(65) Prior Publication Data
US 2020/0073421 A1    Mar. 5, 2020

(30) Foreign Application Priority Data

Dec. 22, 2016  (JP) ................................ 2016-249764

(51) Int. Cl.
*G05F 1/573* (2006.01)
*G05F 1/569* (2006.01)
(Continued)

(52) U.S. Cl.
CPC .................. *G05F 1/56* (2013.01); *G05F 3/26* (2013.01); *H02M 3/156* (2013.01)

(58) Field of Classification Search
CPC . G05F 1/56; G05F 1/565; G05F 1/571; G05F 1/573; G05F 1/575; G05F 1/569
See application file for complete search history.

(56) References Cited

U.S. PATENT DOCUMENTS 9,323,258 B2 *  4/2016  Nakashimo ............. G05F 1/575
2009/0284886 A1  11/2009  Matsumoto
(Continued)

FOREIGN PATENT DOCUMENTS

JP  2007-280025 A  10/2007
JP  2009-044280 A   2/2009
(Continued)

OTHER PUBLICATIONS

International Search Report and Written Opinion for related International Application No. PCT/JP2017/045326 dated Feb. 27, 2018; English translation of ISR provided; 6 pages.

*Primary Examiner* — Gary L Laxton
(74) *Attorney, Agent, or Firm* — Procopio, Cory, Hargreaves & Savitch LLP (57) ABSTRACT

A power supply circuit includes an output transistor which adjusts an input voltage and generates an output voltage, an error amplifier which generates a control voltage for the output transistor according to a difference between a feedback voltage corresponding to the output voltage and a reference voltage, an overcurrent protection circuit which controls the error amplifier according to a result of monitoring the control voltage and controls the control voltage so as to drop the output voltage, and an undershoot detection circuit Which detects an undershoot of the output voltage and controls the control voltage for the output transistor so as to suppress the output voltage from dropping.

6 Claims, 5 Drawing Sheets

(51) Int. Cl.
*G05F 1/56* (2006.01)
*G05F 3/26* (2006.01)
*H02M 3/156* (2006.01)

(56) References Cited

U.S. PATENT DOCUMENTS

2010/0156373 A1\* 6/2010 Imura .................. G05F 1/56
 323/282
2013/0154605 A1\* 6/2013 Nagata .................. G05F 3/02
 323/313

FOREIGN PATENT DOCUMENTS

| JP | 2010-152451 A | 7/2010 |
| JP | 2013-130937 A | 7/2013 |

\* cited by examiner

POWER SUPPLY CIRCUIT

BACKGROUND

Technical Field

The present invention relates to a power supply circuit provided with a countermeasure for suppressing occurrence of an undershoot in which an output voltage instantaneously drops greatly.

Related Art

Figure 4:
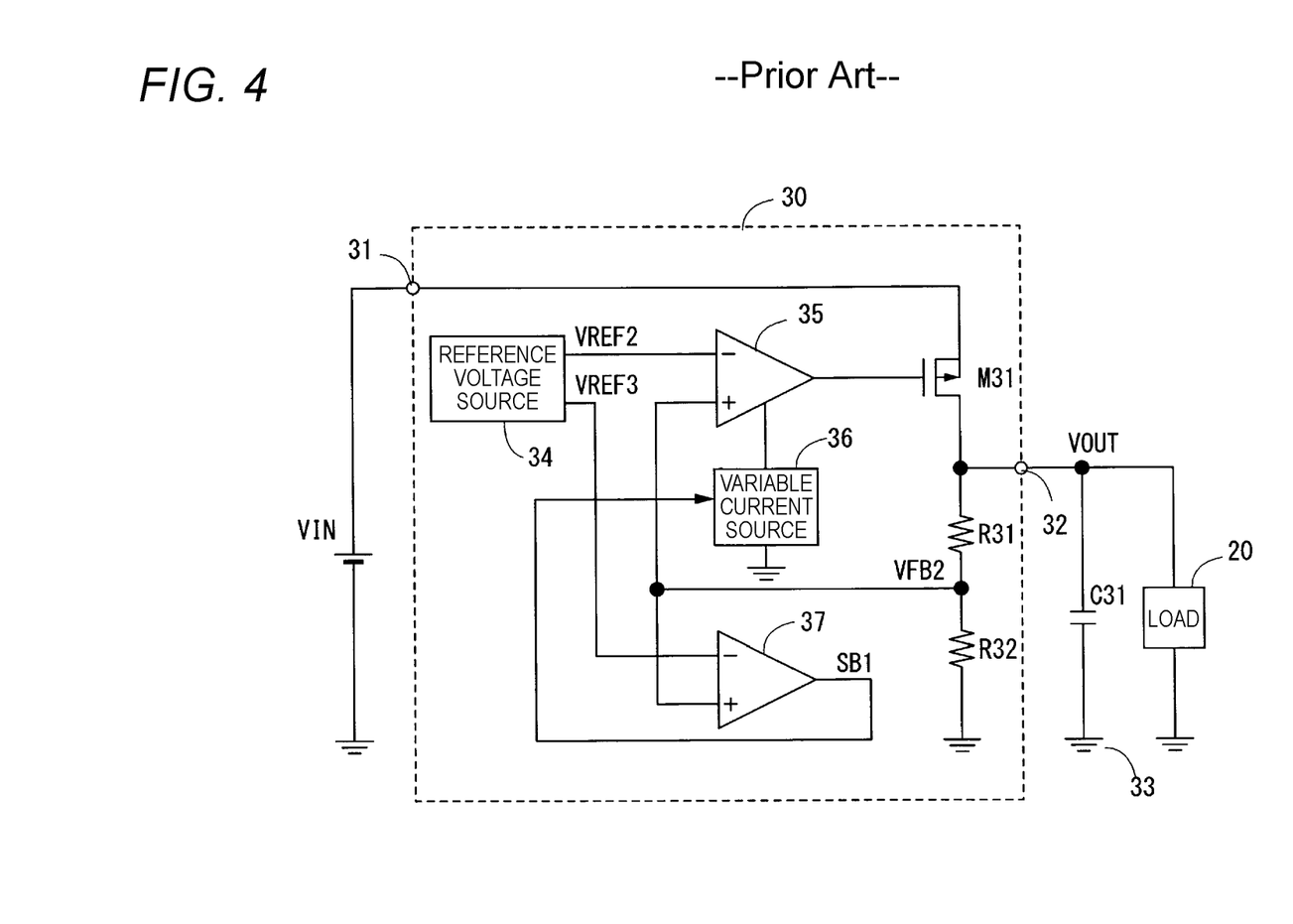
FIG. 4 is a circuit diagram of a conventional power supply circuit.

Conventionally, for example, a power supply circuit 30 shown in FIG. 4 is known as a power supply circuit provided with a countermeasure against an undershoot (Patent Document 1). In the power supply circuit 30, a reference numeral 31 represents an input terminal, a reference numeral 32 represents an output terminal, a reference numeral 33 represents a ground terminal, a reference numeral 34 represents a reference voltage source, a reference numeral 35 represents an error amplifier, a reference numeral 36 represents a variable current source, a reference numeral 37 represents a comparator, and a reference numeral M31 represents a PMOS-type output transistor.

In a normal operation, an output voltage of the error amplifier 35 controls a gate of the output transistor M31. The error amplifier 35 differencially amplifies so as to be VFB2=VREF2. A reference voltage VREF2 is generated by the reference voltage source 34, a feedback voltage VFB2 is obtained at a common connection point between output voltage detection resistors R31 and R32 connected between the output terminal 32 and the ground terminal 33. Therefore, an output voltage VOUT is controlled to a target value corresponding to the reference voltage VREF2.

In recent years, in a power supply circuit, a demand for a low current consumption is strong from various fields (vehicles, home appliances, industrial equipment, or the like), and it is required to design without increasing the current consumption. In order to reduce the current consumption, it is necessary to reduce an operating current (a tail current, or the like) of the error amplifier. However, when the operating current is reduced, a response characteristic is sacrificed, and thus a quick response to the above-described undershoot cannot be realized. As described above, in order to reduce the current consumption of the power supply circuit, it is one of the problems to improve the response characteristic.

Therefore, in the power supply circuit 30 in FIG. 4, the variable current source 36 is connected as a current source for supplying an operating current to the error amplifier 35, a reference voltage VREF3 (VREF3<VREF2) is generated by the reference voltage source 34, the comparator 37 which compares the reference voltage VREF3 with the feedback voltage VFB2 is provided to detect an undershoot, and a current value of the variable current source 36 is switched by a boost signal SB1 output from the comparator 37.

When the input voltage VIN or load current fluctuates, an undershoot occurs in which the output voltage VOUT is greatly dropped instantaneously, and VFEF3>VFB2.

The comparator 37 detects the change, the boost signal SB1, which is an output signal, changes from "L" to "H". And the current value of the variable current source 36 is switched to a larger current value than a normal current value reduced to a small value for reducing the current consumption. Accordingly, the operating current of the error amplifier 35 is increased more than that during normal time. And a voltage between the gate and a source of the output transistor M31 is larger, the output voltage VOUT is rapidly raised. As a result, the undershoot is suppressed.

PRIOR ART LITERATURE

Patent Literature

[Patent Document 1] JP-A-2007-280025

BRIEF SUMMARY OF THE INVENTION

Technical Problems

However, in a method of monitoring the reference voltage VREF3 and the feedback voltage VFB2 to suppress the undershoot of the output voltage VOUT, even when the output voltage VOUT drops due to a factor other than the undershoot, since the operation current of the error amplifier 35 may be increased by considering the change of the output voltage VOUT as the undershoot, there is a possibility that a stability of the output voltage VOUT is lost.

Although an overcurrent protection circuit is not shown in the circuit in FIG. 4, for example, a problem occurs when the output voltage VOUT is dropped by an operation of the overcurrent protection circuit. A normal power supply circuit incorporates an overcurrent protection circuit to prevent element breakdown caused by thermal runaway. The overcurrent protection circuit monitors a gate voltage of the output transistor, suppresses a drive capability of the output transistor to drop the output voltage when the gate voltage becomes a level at which a drive force of the output transistor is increased, and controls the error amplifier so that an output current does not flow by a certain amount or more.

Therefore, when the output voltage is dropped by the operation of the overcurrent protection circuit, the drop in the output voltage is detected as an undershoot, and the operating current of the error amplifier increases. In other words, an undershoot suppressing operation for increasing the drive force of the output transistor and an overcurrent protection operation for limiting the drive capability of the output transistor collide with each other, and a circuit operation becomes unstable. As a result, overcurrent protection is not normally performed, and there is a possibility that a desired current limit is not applied and the element breakdown occurs.

The present invention has been made in view of the above problems, and an object of the present invention is to provide a power supply circuit in which an overcurrent protection circuit operation does not lead to an undershoot suppressing operation, so that only an undershoot, which is an instantaneous output voltage drop, can be suppressed.

Solution to Problem (1) To achieve the above object, according to the present invention, there is provided a power supply circuit including an output transistor which adjusts an input voltage and generates an output voltage, an error amplifier which generates a control voltage for the output transistor according to a difference between a feedback voltage corresponding to the output voltage and a reference voltage, an overcurrent protection circuit which controls the error amplifier according to a result of monitoring the control voltage and controls the control voltage so as to drop the output voltage, and an undershoot detection circuit which detects an undershoot of the output voltage and controls the control voltage for the output transistor so as to suppress the output voltage from dropping. The error amplifier includes a pair of differential connection transistors which compares the feedback voltage with the reference voltage, a current source which supplies an operation current to the pair of differential connection transistors, a pair of current mirror connection transistors which generates the control voltage according to a result of the comparison of the pair of differential connection transistors, and a pair of gate-grounded transistors connected between drains of the pair of differential connection transistors and drains of the pair of current mirror connection transistors. The overcurrent protection circuit is connected to apply an output signal of the overcurrent protection circuit to one of drains of the pair of differential connection transistors. The undershoot detection circuit increases the pair of operating current of the differential connection transistors when a difference between drain voltages of the pair of differential connection transistors exceeds a threshold value.

(2) According to the present invention, there is provided a power supply circuit including an output transistor which adjusts an input voltage and generates an output voltage, an error amplifier which generates a control voltage for the output transistor according to a difference between a feedback voltage corresponding to the output voltage and a reference voltage, an overcurrent protection circuit which controls the error amplifier according to a result of monitoring the control voltage and controls the control voltage so as to drop the output voltage, and an undershoot detection circuit which detects an undershoot of the output voltage and controls the control voltage for the output transistor so as to suppress the output voltage from dropping. The error amplifier includes a pair of differential connection transistors which compares the feedback voltage with the reference voltage, a current source which supplies an operation current to the pair of differential connection transistors, a pair of current mirror connection transistors which generates the control voltage according to a result of the comparison of the pair of differential connection transistors, and a pair of gate-grounded transistors connected between drains of the pair of differential connection transistors and drains of the pair of current mirror connection transistors. The overcurrent protection circuit is connected to apply an output signal of the overcurrent protection circuit to one of drains of the pair of differential connection transistors. The undershoot detection circuit directly controls the control voltage for the output transistor when a difference between drain voltages of the pair of differential connection transistors exceeds a threshold value.

(3) The power supply circuit according to (1), wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a fifth transistor having a second conductivity type whose drain is connected to a drain of the third transistor, and a sixth transistor having the second conductivity type whose drain and gate are connected to a drain of the fourth transistor and a gate of the fifth transistor.

(4) The power supply circuit according to (2), wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a fifth transistor having a second conductivity type whose drain is connected to a drain of the third transistor, and a sixth transistor having the second conductivity type whose drain and gate are connected to a drain of the fourth transistor and a gate of the fifth transistor.

(5) The power supply circuit according to (1), wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a sixth transistor having a second conductivity type whose drain is connected to a drain of the fourth transistor, and a fifth transistor having the second conductivity type whose drain and gate are connected to a drain of the third transistor and a gate of the sixth transistor.

(6) The power supply circuit according to (2), wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a sixth transistor having a second conductivity type whose drain is connected to a drain of the fourth transistor, and a fifth transistor having the second conductivity type whose drain and gate are connected to a drain of the third transistor and a gate of the sixth transistor.

Advantageous Effects of Invention

According to the present invention, since the pair of gate-grounded transistors is connected between the pair of differential connection transistors and the pair of current mirror connection transistors of the error amplifier, the drains of the pair of differential connection transistors are controlled to have substantially the same voltage. However, when the undershoot occurs, since a large difference is instantaneously generated in the voltage between the drains of the pair of differential connection transistors, the undershoot detection circuit increases a drive force of the output transistor, so that suppression of the undershoot can be realized. For a case where the operating current of the pair of differential connection transistors is increased, since the increase is generated only when the undershoot occurs, current consumption during a normal operation can be reduced. In addition, when an overcurrent protection operation is performed, since drain currents of the pair of gate-grounded transistors are controlled to be substantially the same by the overcurrent protection circuit, the drains of the pair of differential connection transistors have substantially at the same voltage, so that there is no situation where the overcurrent protection operation leads to an undershoot suppressing operation if the threshold value of the undershoot detection circuit is appropriately set. As described above, according to the present invention, the undershoot can be suppressed separately from the overcurrent protection operation.

DETAILED DESCRIPTION

First Embodiment

Figure 1:
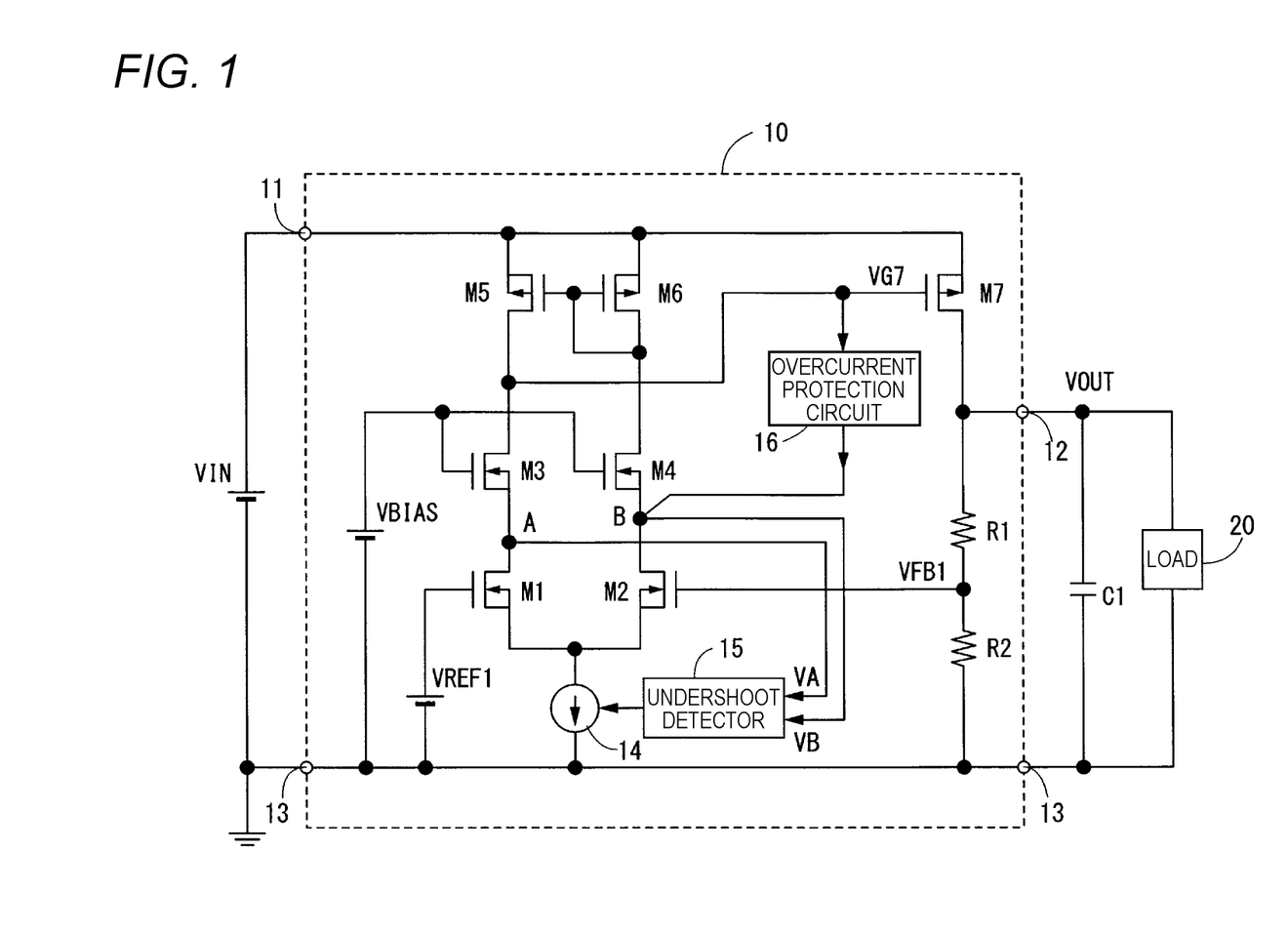
FIG. 1 is a circuit diagram of a power supply circuit according to a first embodiment of the present invention.

FIG. 1 shows a power supply circuit 10 according to a first embodiment of the present invention. A reference numeral 11 represents an input terminal to which an input voltage VIN is input, a reference numeral 12 represents an output terminal for outputting an output voltage VOUT, and a reference numeral 13 represents a ground terminal. Reference numerals M1, M2 represent NMOS-type transistors configuring a pair of differential connection transistors whose sources are connected in common to a variable current source 14, a reference voltage VREF1 is input to a gate of the transistor M1, and a feedback voltage VFB1 is input to a gate of the transistor M2. Reference numerals M3, M4 represent a pair of NMOS-type gate-grounded transistors. A source of the transistor M3 is connected to a drain of the transistor M1, a source of the transistor M4 is connected to a drain of the transistor M2, and a common bias voltage VBIAS is input to each of gates of the transistors M3, M4. Reference numerals M5, M6 represent PMOS-type transistors configuring a pair of current mirror connection transistors as active loads of the transistors M1, M2. A source of the transistor M5 is connected to the input terminal 11, and a drain thereof is connected to a drain of the transistor M3. A source of the transistor M6 is connected to the input terminal 11, and a gate and a drain thereof are respectively connected to a gate of the transistor M5 and a drain of the transistor M4. The above transistors M1 to M6 configure an error amplifier.

A reference numeral M7 represents a PMOS-type output transistor, a source thereof is connected to the input terminal 11, a gate thereof is connected to a common drain of the transistors M3, M5, and a drain thereof is connected to the output terminal 12. Resistors R1, R2 for detecting the output voltage VOUT are connected in series between the output terminal 12 and the ground terminal 13, and the feedback voltage VFB1 is extracted from a common connection point of the resistors R1, R2.

A reference numeral 15 represents an undershoot detector which takes in a voltage VA at a node A which is the drain of the transistor M1 and a voltage VB at a node B which is the drain of the transistor M2, and switches a current value of the variable current source 14 to a larger current value than a current value during a normal operation, only during a period in which a difference (=VB−VA) exceeds a preset threshold value. A reference numeral 16 represents an overcurrent protection circuit which takes in a gate voltage VG7 of the output transistor M7, and performs control to lower the voltage at the node B when the gate voltage VG7 is lower than a predetermined value. A reference numeral C1 represents an output capacitor for stabilizing the output voltage VOUT connected between the output terminal 12 and the ground terminal 13, and a reference numeral 20 represents a load connected between the output terminal 12 and the ground terminal 13.

During the normal operation, the feedback voltage VFB1 and the reference voltage VREF1 obtained by dividing the output voltage VOUT by the resistors R1, R2 are compared by the transistors M1, M2. Further, since VREF1<VFB1 when the output voltage VOUT is higher than a target value, the voltage VA at the node A and the voltage VB at the node B become VA>VB, a drain voltage of the transistor M5 rises, the gate voltage VG7 of the transistor M7 rises, and a control is performed so that the output voltage VOUT is dropped. On the other hand, since VREF1>VFB1 when the output voltage VOUT is lower than the target value, the voltage VA at the node A and the voltage VB at the node B become VA<VB, the drain voltage of the transistor M5 drops, the gate voltage VG7 of the transistor M7 drops, and a control is performed so that the output voltage VOUT becomes high.

In this manner, a negative feedback control is performed so that the output voltage VOUT becomes a target voltage corresponding to the reference voltage VREF1. At this time, since the voltages VA, VB at the nodes A, B are controlled to be "VBIAS−VGS" (VGS represents gate-source voltages of the transistors M3, M4) by the pair of gate-grounded transistors M3, M4, when the output voltage VOUT fluctuates, the voltages VA, VB fluctuate slightly in accordance with the fluctuation, and the above-described negative feedback control is performed.

Next, when a normal control is performed so that the output voltage VOUT becomes the target voltage, if an undershoot (several msec) occurs in which the output voltage VOUT instantaneously drops greatly due to an abrupt decrease in the input voltage VIN or an abrupt increase in a load current, the feedback voltage VFB1 instantaneously drops greatly so as to be VREF1>VFB1, and the voltages VA, VB at the nodes A, B, which are controlled to be substantially the same voltage by the gate-grounded transistors M3, M4, temporarily become VA<VB. Further, when a value of the difference (=VB−VA) exceeds the threshold value set in the undershoot detector 15, the current value of the variable current source 14 is switched to a larger current value than the current value during the normal operation by the undershoot detector 15. Therefore, drain currents of the transistors M1, M3 increase so as to increase a current discharging the gate of the output transistor M7, the gate voltage VG7 drops so as to increase a voltage between the gate and the source of the output transistor M7, so that the output voltage VOUT is instantaneously raised. Time from the occurrence of the undershoot to convergence becomes shorter as the current value of the variable current source 14 increases.

Figure 5:
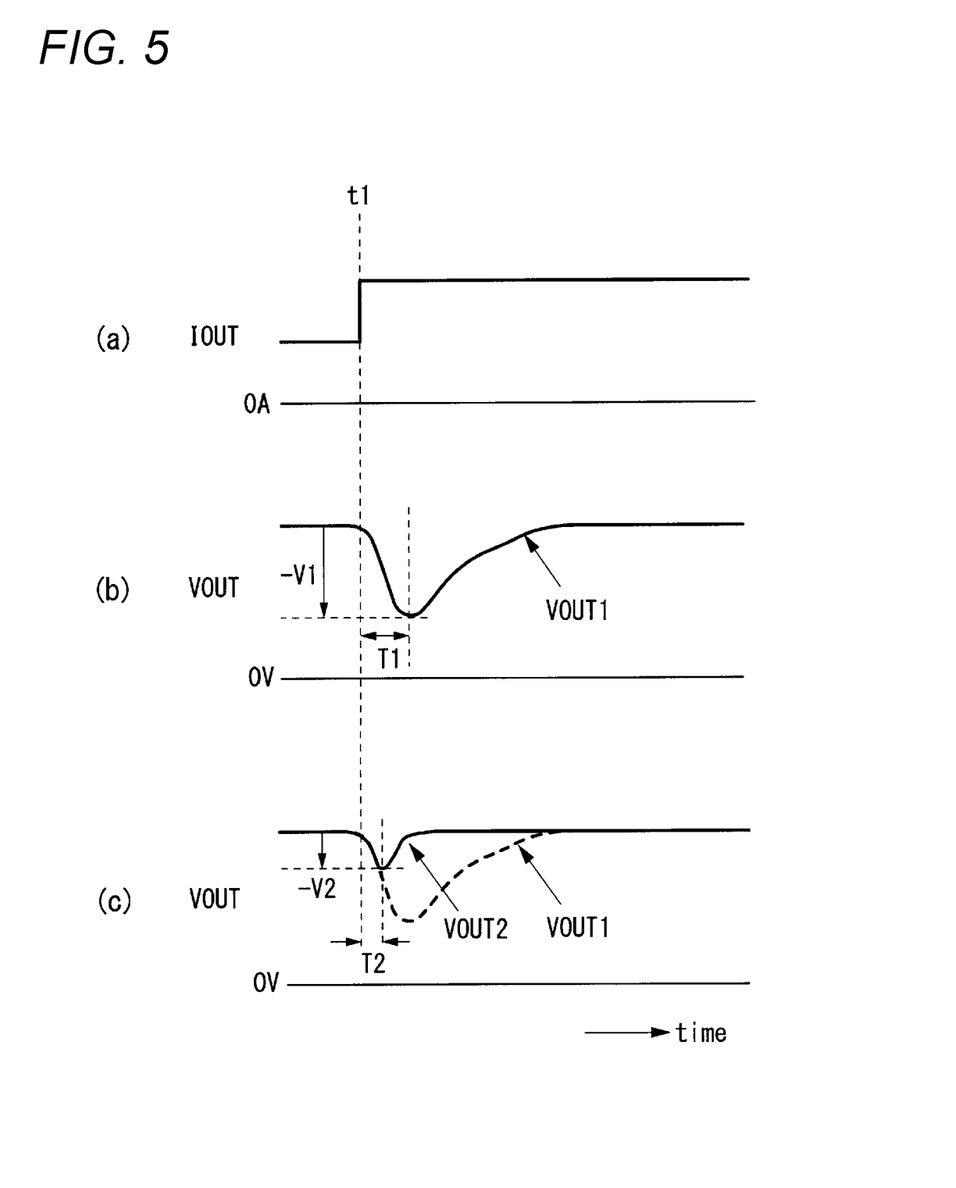
FIGS. 5(a) to 5(c) are operation waveform diagrams of the power supply circuit according to the first embodiment of the present invention.

Operation waveforms when the undershoot described above occurs are shown in FIGS. 5(a) to 5(c). As shown in FIG. 5(a), when a load current IOUT suddenly increases in a pulse manner at time t1, as shown in FIG. 5(b), the output voltage VOUT has an undershoot waveform (VOUT1) in which the output voltage VOUT drops by a voltage V1 during a time period T1. In contrast, in the present embodiment, when the output voltage VOUT starts to drop at time t1 and the undershoot detector 15 operates, a drive force of the output transistor M7 is instantaneously increased, and as shown in FIG. 5(c), a waveform (VOUT2) is obtained in which a voltage drop value is decreased from V1 to V2 so as to suppress the drop of the output voltage VOUT, and voltage drop time is shortened from T1 to T2.

During the normal operation, when the gate voltage VG7 of the output transistor M7 drops and the overcurrent protection circuit 16 operates, the voltage VB at the node B is lowered by the overcurrent protection circuit 16 to increase the gate voltage VG7 of the output transistor M7, a control is performed so as to drop the output voltage VOUT. At this time, since the gate-grounded transistors M3, M4 control the voltages VA, VB to be VA=VB, a level at which the voltage VB rises by the overcurrent protection circuit 16 is small, and the difference (=VB−VA) of the voltages VA, VB does not become so large that the undershoot detector 15 operates. Therefore, there is no possibility that the overcurrent protection circuit 16 does not operate normally.

Similarly, when the gate voltage VG7 of the output transistor M7 drops due to an undershoot suppressing operation and the overcurrent protection circuit 16 operates, the difference (=VB−VA) of the voltages VA, VB does not become so large that the undershoot detector 15 operates again.

Second Embodiment

Figure 2:
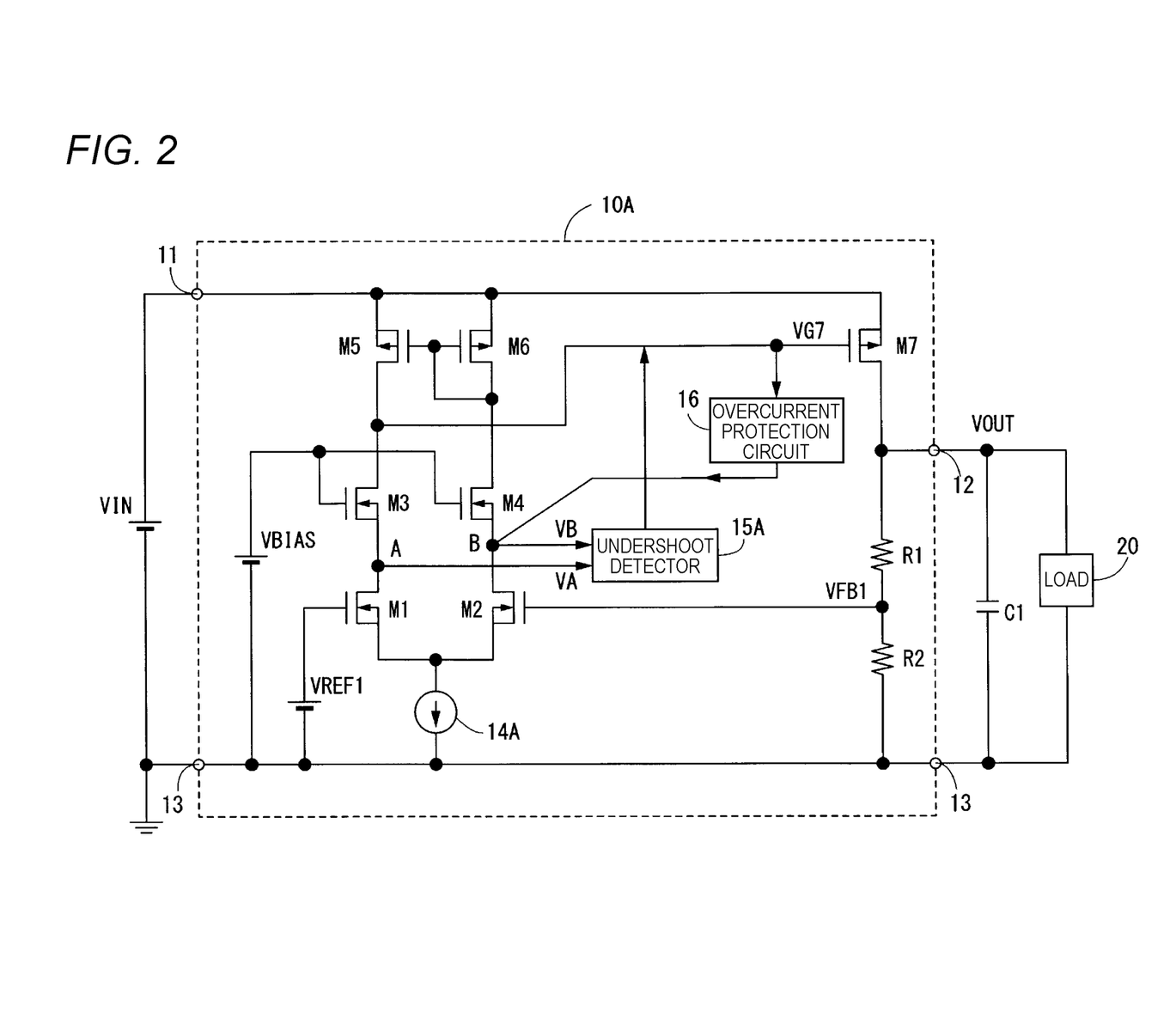
FIG. 2 is a circuit diagram of a power supply circuit according to a second embodiment of the present invention.

FIG. 2 shows a power supply circuit 10A according to a second embodiment of the present invention. Here, the gate voltage VG7 of the output transistor M7 is directly controlled by an output signal of an undershoot detector 15A which detects the difference between the voltages VA, VB. In addition, a current source 14 is changed to a current source which supplies a constant current for realizing low current consumption.

In the present embodiment, when the difference (=VB−VA) between the voltages VA, VB exceeds a threshold value of the undershoot detector 15A, since the gate voltage VG7 is directly controlled to a low voltage without performing an operation of the error amplifier including the transistors M1 to M6, response speed up to suppression of undershoot can be increased as compared with a case of using the variable current source 14 for switching the current.

Third Embodiment

Figure 3:
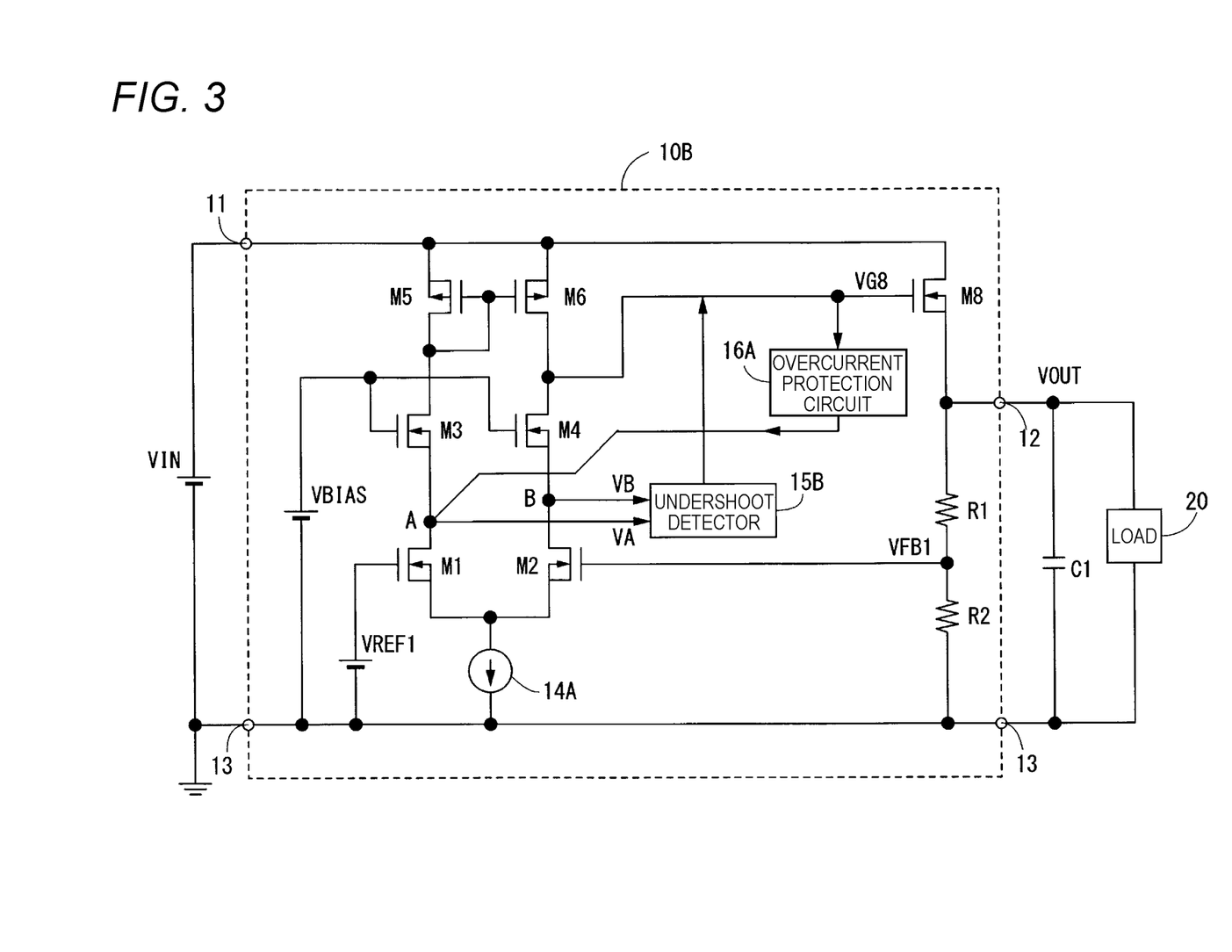
FIG. 3 is a circuit diagram of a power supply circuit according to a third embodiment of the present invention.

FIG. 3 shows a power supply circuit 10B according to a third embodiment of the present invention. Here, the output transistor is replaced with an NMOS-type transistor M8 from the PMOS-type transistor M7. Therefore, the gates of the transistors M5, M6 of the error amplifier are connected to the drain of the transistor M5, and the drain of the transistor M6 is connected to a gate of the output transistor M8. When the difference (=VB−VA) between the voltages VA, VB exceeds the threshold value, an undershoot detector 15B directly controls a gate voltage VG8 of the output transistor M8 to a high voltage. When the gate voltage VG8 of the output transistor M8 exceeds a predetermined value, an overcurrent protection circuit 16A performs control to increase the voltage at the node A. The present embodiment operates in the same manner as in the second embodiment.

Although the present invention has been described in detail with reference to specific embodiments, it will be apparent to those skilled in the art that various changes and modifications can be made without departing from the spirit and scope of the present invention.

The present application is based on Japanese Patent Application No. 2016-249764, filed on Dec. 22, 2016, the contents of which are incorporated herein by reference.

REFERENCE SIGNS LIST 10, 10A, 10B power supply circuit
11 input terminal
12 output terminal
13 ground terminal
14 variable current source
14A constant current source
15, 15A, 15B undershoot detector
16, 16A overcurrent protection circuit
30 power supply circuit
31 input terminal
32 output terminal
33 ground terminal
34 reference voltage source
35 error amplifier
36 variable current source
37 comparator

The invention claimed is:
1. A power supply circuit comprising:
an output transistor which adjusts an input voltage and generates an output voltage;
an error amplifier which generates a control voltage for the output transistor according to a difference between a feedback voltage corresponding to the output voltage and a reference voltage;
an overcurrent protection circuit which controls the error amplifier according to a result of monitoring the control voltage and controls the control voltage so as to drop the output voltage; and
an undershoot detection circuit which detects an undershoot of the output voltage and controls the control voltage for the output transistor so as to suppress the output voltage from dropping,
wherein the error amplifier includes a pair of differential connection transistors which compares the feedback voltage with the reference voltage, a current source which supplies an operation current to the pair of differential connection transistors, a pair of current mirror connection transistors which generates the control voltage according to a result of the comparison of the pair of differential connection transistors, and a pair of gate-grounded transistors connected between drains of the pair of differential connection transistors and drains of the pair of current mirror connection transistors, wherein the overcurrent protection circuit is connected to apply an output signal of the overcurrent protection circuit to one of drains of the pair of differential connection transistors, and wherein the undershoot detection circuit increases the operating current of the pair of differential connection transistors when a difference between drain voltages of the pair of differential connection transistors exceeds a threshold value.

2. A power supply circuit comprising:

an output transistor which adjusts an input voltage and generates an output voltage;

an error amplifier which generates a control voltage for the output transistor according to a difference between a feedback voltage corresponding to the output voltage and a reference voltage;

an overcurrent protection circuit which controls the error amplifier according to a result of monitoring the control voltage and controls the control voltage so as to drop the output voltage; and an undershoot detection circuit which detects an undershoot of the output voltage and controls the control voltage for the output transistor so as to suppress the output voltage from dropping, wherein the error amplifier includes a pair of differential connection transistors which compares the feedback voltage with the reference voltage, a current source which supplies an operation current to the pair of differential connection transistors, a pair of current mirror connection transistors which generates the control voltage according to a result of the comparison of the pair of differential connection transistors, and a pair of gate-grounded transistors connected between drains of the pair of differential connection transistors and drains of the pair of current mirror connection transistors, wherein the overcurrent protection circuit is connected to apply an output signal of the overcurrent protection circuit to one of drains of the pair of differential connection transistors, and wherein the undershoot detection circuit directly controls the control voltage for the output transistor when a difference between drain voltages of the pair of differential connection transistors exceeds a threshold value.

3. The power supply circuit according to claim 1, wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a fifth transistor having a second conductivity type whose drain is connected to a drain of the third transistor, and a sixth transistor having the second conductivity type whose drain and gate are connected to a drain of the fourth transistor and a gate of the fifth transistor.

4. The power supply circuit according to claim 2, wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a fifth transistor having a second conductivity type whose drain is connected to a drain of the third transistor, and a sixth transistor having the second conductivity type whose drain and gate are connected to a drain of the fourth transistor and a gate of the fifth transistor.

5. The power supply circuit according to claim 1, wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a sixth transistor having a second conductivity type whose drain is connected to a drain of the fourth transistor, and a fifth transistor having the second conductivity type whose drain and gate are connected to a drain of the third transistor and a gate of the sixth transistor.

6. The power supply circuit according to claim 2, wherein the pair of differential connection transistors includes a first transistor having a first conductivity type whose source is connected to the current source and whose gate is input with the reference voltage, and a second transistor having the first conductivity type whose source is connected to the current source and whose gate is input with the feedback voltage, wherein the pair of gate-grounded transistors includes a third transistor having the first conductivity type whose source is connected to a drain of the first transistor and whose gate is input with a bias voltage, and a fourth transistor having the first conductivity type whose source is connected to a drain of the second transistor and whose gate is input with the bias voltage, and wherein the pair of current mirror connection transistors includes a sixth transistor having a second conductivity type whose drain is connected to a drain of the fourth transistor, and a fifth transistor having the second conductivity type whose drain and gate are connected to a drain of the third transistor and a gate of the sixth transistor.

* * * * *